(12) United States Patent
Sandy et al.

(10) Patent No.: US 9,217,337 B2
(45) Date of Patent: Dec. 22, 2015

(54) ADJUSTABLE ENGINE MOUNT

(75) Inventors: David F Sandy, Milford, CT (US); Zhijun Zheng, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 896 days.

(21) Appl. No.: 13/468,072

(22) Filed: May 10, 2012

(65) Prior Publication Data
US 2013/0302157 A1    Nov. 14, 2013

(51) Int. Cl.
| | | |
|---|---|---|
| *B64D 27/00* | (2006.01) | |
| *F01D 25/28* | (2006.01) | |
| *F02C 7/20* | (2006.01) | |
| *B64D 27/26* | (2006.01) | |

(52) U.S. Cl.
CPC . *F01D 25/28* (2013.01); *F02C 7/20* (2013.01); *B64D 2027/262* (2013.01); *B64D 2027/266* (2013.01); *B64D 2027/268* (2013.01); *Y02T 50/671* (2013.01)

(58) Field of Classification Search
CPC ............... F02C 7/20; B64D 2027/262; B64D 2027/264; B64D 2027/266; B64D 2027/268; F01D 25/28
USPC ...................... 415/213.1, 214.1; 60/796, 797; 248/554–557; 244/54
See application file for complete search history.

(56) References Cited

U.S. PATENT DOCUMENTS

| | | | |
|---|---|---|---|
| 3,979,087 A | | 9/1976 | Boris et al. |
| 5,259,183 A | * | 11/1993 | Debeneix ..................... 60/797 |
| 5,275,357 A | | 1/1994 | Seelen et al. |
| 6,330,995 B1 | | 12/2001 | Mangeiga et al. |
| 6,607,165 B1 | | 8/2003 | Manteiga et al. |
| 6,843,449 B1 | | 1/2005 | Manteiga et al. |
| 7,909,302 B2 | | 3/2011 | Audart-Noel et al. |
| 8,074,923 B2 | | 12/2011 | Foster |
| 8,128,021 B2 | | 3/2012 | Suciu et al. |
| 8,152,094 B2 | | 4/2012 | Foster |
| 2008/0169378 A1 | | 7/2008 | Beaufort et al. |
| 2009/0184197 A1 | | 7/2009 | Cloft |
| 2009/0308078 A1 | | 12/2009 | Foster |
| 2010/0170980 A1 | | 7/2010 | Haramburu et al. |
| 2012/0018575 A1 | | 1/2012 | Whiteford et al. |

FOREIGN PATENT DOCUMENTS

| | | | | |
|---|---|---|---|---|
| DE | 1481644 A | * | 10/1974 | ...................... 244/54 |
| EP | 1103463 B1 | | 6/2005 | |

OTHER PUBLICATIONS

International Preliminary Report on Patentability for International Application No. PCT/US2013/039818 mailed on Nov. 20, 2014.
International Search Report and Written Opinion for International Application No. PCT/US2013/039818 completed on Feb. 18, 2014.

* cited by examiner

*Primary Examiner* — Christopher Verdier
(74) *Attorney, Agent, or Firm* — Carlson, Gaskey & Olds, P.C.

(57) ABSTRACT

A forward engine mount assembly for a gas turbine engine includes a mount beam having a main body with a fore end and an aft end and a forward shackle assembly supported by the fore end of the mount beam. The forward shackle assembly comprises a first link configured to be connected to a first engine case structure and a second link configured to be connected to a second engine case structure. The first and second links are pivotally attached to each other.

19 Claims, 5 Drawing Sheets

FIG. 3B

ADJUSTABLE ENGINE MOUNT

BACKGROUND OF THE INVENTION

This disclosure relates to an engine mount for a gas turbine engine that includes an adjustable attachment feature.

Gas turbine engines are mounted to a pylon using a forward engine mount and an aft engine mount. The forward engine mount is mounted to a compressor case using a shackle with two connection points. The shackle reacts to both vertical and lateral loads between the engine and the pylon. The shackle is comprised of two identically shaped plates that are attached to each other such that a crack cannot propagate from one plate to the other, which satisfies a failsafe requirement for the shackle.

The compressor case includes two case holes that are to be aligned with two corresponding shackle holes in the two plates. Fasteners or pins are then installed in the aligned holes. The case holes and shackle holes are drilled and reamed as required to maintain fit specifications. In order to maintain interchangeability between the two connecting components, the position tolerance of the holes cannot accumulate to more than the minimum clearance allowed at the pinned joint. This is a tight requirement with significant associated cost.

To address this issue, the diameter of the holes in the case and/or shackle could be increased for a "loose" fit; however, this would result in a structural and weight penalty. As the pins are not tightly held within the holes due to the "loose" fit, one of the pins will be subjected to all of the engine's lateral loads before the other pin. The case and the shackle will then need to deform by a certain amount until the second pin banks against an edge of its hole and begins to share the load. This results in an unequal load share, which requires that the case lugs be designed for a high load, and thus have a higher weight.

Further, while the shackle is made from two plates to prevent crack propagation, additional failsafe requirements may not be met by the stacked two plate configuration. For example, a failure in one of the engine case lugs will compromise the vertical and lateral load paths.

SUMMARY OF THE INVENTION

In one featured embodiment, a forward engine mount assembly for a gas turbine engine includes a mount beam having a main body with a fore end and an aft end, and a forward shackle assembly supported by the fore end of the mount beam and comprising a first link configured to be connected to a first engine case structure and a second link configured to be connected to a second engine case structure, the first and second links being pivotally attached to each other.

In another embodiment according to the previous embodiment, the first and second links each include at least a first hole for connection to a respective one of the first and second engine case structures and a second hole configured to receive a pin extending outwardly from the fore end of the mount beam that pivotally connects the first and second links.

In another embodiment according to any of the previous embodiments, the first and second case structures comprise mounting lugs with holes configured to receive pins to secure the first and second links to an engine outer casing.

In another embodiment according to any of the previous embodiments, the first and second links each include a third hole configured to receive a failsafe pin extending outwardly from the fore end of the mount beam.

In another embodiment according to any of the previous embodiments, the second hole is positioned between the first and third holes on each link body of the first and second links.

In another embodiment according to any of the previous embodiments, one of the first and second links includes a slot to receive a portion of the other of the first and second links.

In another embodiment according to any of the previous embodiments, the first and second links are pivotally connected to each other with a pin that extends transversely through the slot.

In another embodiment according to any of the previous embodiments, the first link comprises a first link body having a first case connection hole and a first beam connection hole and the second link comprises a second link body having a second case connection hole and a second beam connection hole. The first and second case connection holes are spaced apart from each other and the first and second beam connection holes are aligned with each other.

In another embodiment according to any of the previous embodiments, the first link body includes a first failsafe hole and the second link body includes a second failsafe hole that is aligned with the first failsafe hole.

In another embodiment according to any of the previous embodiments, the first link body includes a first end with the first case connection hole. The first link body comprises a first body portion and a second body portion spaced apart from the first body portion by a gap, each of the first and second body portions including aligned first beam connection holes and aligned first failsafe holes. The second link body is positioned within the gap such that the second failsafe hole is aligned with the first failsafe holes and the second beam connection hole is aligned with the first beam connection holes.

In another embodiment according to any of the previous embodiments, a first thrust rod pivotally connected to the aft end of the mount beam is included and is configured for connection to an engine outer case adjacent the first engine case structure and a second thrust rod pivotally connected to the aft end of the mount beam and configured for connection to an engine outer case adjacent the second engine case structure.

In another featured embodiment, a gas turbine engine has an engine outer case, a rear engine mount configured to attach the engine outer case to an aircraft support structure, and a forward engine mount configured to attach the engine outer case to the aircraft support structure. The forward engine mount has a mount beam having a main body with a fore end and an aft end, a forward shackle assembly supported by the fore end of the mount beam and comprising a first link connected to the engine outer case at a first attachment interface and a second link connected to the engine outer case at a second attachment interface, the first and second links being pivotally attached to each other, and first and second thrust rods connected to the aft end of the main body and to the engine outer case.

In another embodiment according to the previous embodiment, the main body includes a pin extending outwardly from the fore end. The first link comprises a first link body having a first case connection hole and a first beam connection hole and the second link comprises a second link body having a second case connection hole and a second beam connection hole. The first and second case connection holes are spaced apart from each other and the first and second beam connection holes are aligned with each other and fit onto the pin.

In another embodiment according to any of the previous embodiments, the pin comprises a main mount pin. The main body includes a failsafe pin extending outwardly from the fore end of the main body and spaced apart from the main mount pin. The first link body includes a first failsafe hole and the second link body includes a second failsafe hole that is aligned with the first failsafe hole. The failsafe pin is fit into the first and second failsafe holes.

In another embodiment according to any of the previous embodiments, the first link body includes a first end with the first case connection hole. The first link body extends from the first end and separates into a first portion and a second portion spaced apart from the first portion by a gap, each of the first and second portions including aligned first beam connection holes and aligned first failsafe holes. The second link body is positioned within the gap such that the second failsafe hole is aligned with the first failsafe holes and the second beam connection hole is aligned with the first beam connection holes.

In another embodiment according to any of the previous embodiments, the failsafe pin banks against an edge of the first and second failsafe holes when one of the first or second attachment interfaces experiences a failure.

In another embodiment according to any of the previous embodiments, the first and second attachment interfaces comprise first and second mounting lugs on the engine outer case.

In another embodiment according to any of the previous embodiments, a first pin is included that connects the first link to the first mounting lug and a second pin that connects the second link to the second mounting lug.

In another embodiment according to any of the previous embodiments, the forward shackle assembly includes a failsafe feature that allows vertical and lateral loads to be carried through one of the first and second links in light of a failure experienced by the other of the first and second links.

In another embodiment according to any of the previous embodiments, the failsafe feature has a first failsafe hole in the first link and a second failsafe hole in the second link, the first and second failsafe holes being aligned with each other and received on a failsafe pin of the mount beam.

These and other features of this application will be best understood from the following specification and drawings, the following of which is a brief description.

DETAILED DESCRIPTION

Figure 1:
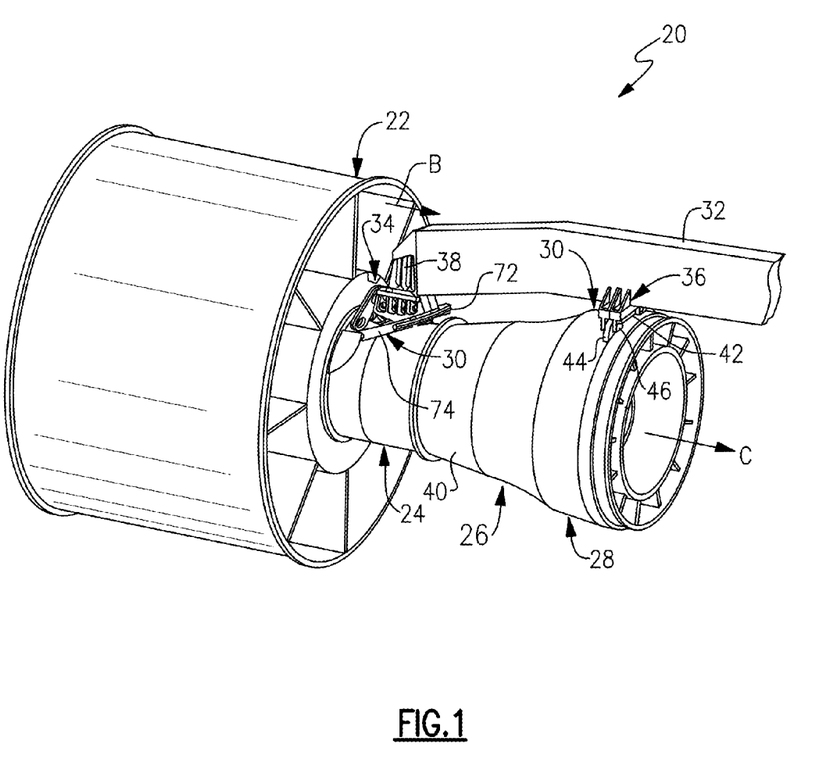
FIG. 1 schematically illustrates a gas turbine engine with a mounting configuration.

FIG. 1 schematically illustrates a gas turbine engine 20 that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. The core airflow C is compressed by the compressor section 24, mixed and burned with fuel in the combustor section 26, and then expanded over the turbine section 28. The turbine 28 section rotationally drives a plurality of spools (not shown) in response to the expansion. Although depicted as a turbofan gas turbine engine in the disclosed non-limiting embodiment, it should be understood that the concepts described herein are not limited to use with turbofans as the teachings may be applied to other types of turbine engines.

A mounting arrangement 30 is positioned between the gas turbine engine 20 and a rigid structure 32 of an attachment strut that is fixed to an aircraft wing (not shown) as known. The mounting arrangement 30 includes a forward engine mount assembly 34 and a rearward engine mount assembly 36 that connect to the rigid structure 32. In one example, the rigid structure 32 includes a pyramid portion 38 or similar structure that extends to connect to the forward engine mount assembly 34.

The forward engine mount assembly 34 and the rearward engine mount assembly 36 attach to an engine outer casing 40. In one example, the rearward engine mount assembly 36 comprises a rear mount beam 42 having an upper portion that is attached to the rigid structure 32 and a lower portion that is connected to mounting lugs 44 on the engine outer casing 40 with pins 46. This is just one example of a rearward engine mount assembly 36, and it should be understood that other rear mount configurations could also be used.

Figure 2A:
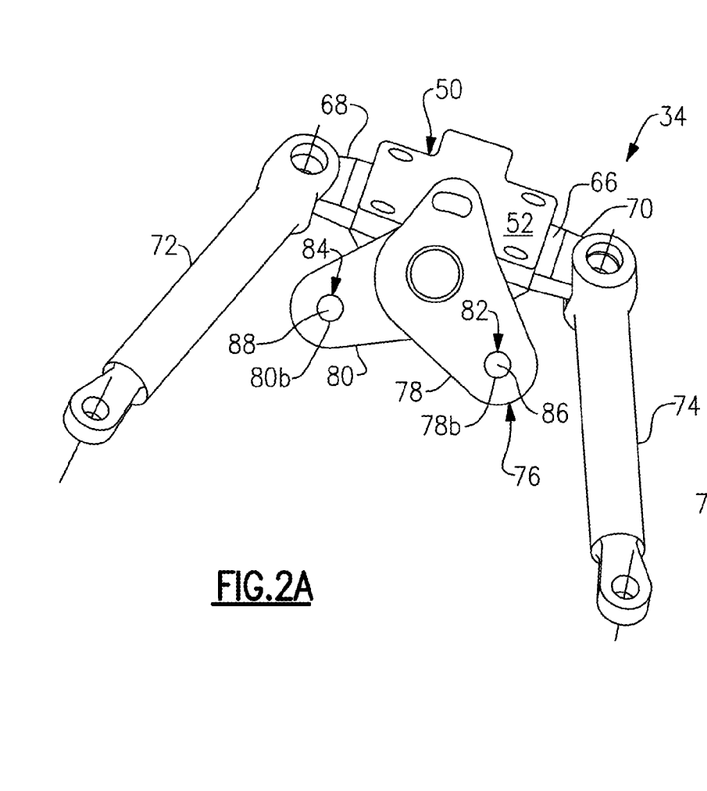
FIG. 2A is a perspective view of a forward mount assembly.
Figure 2B:
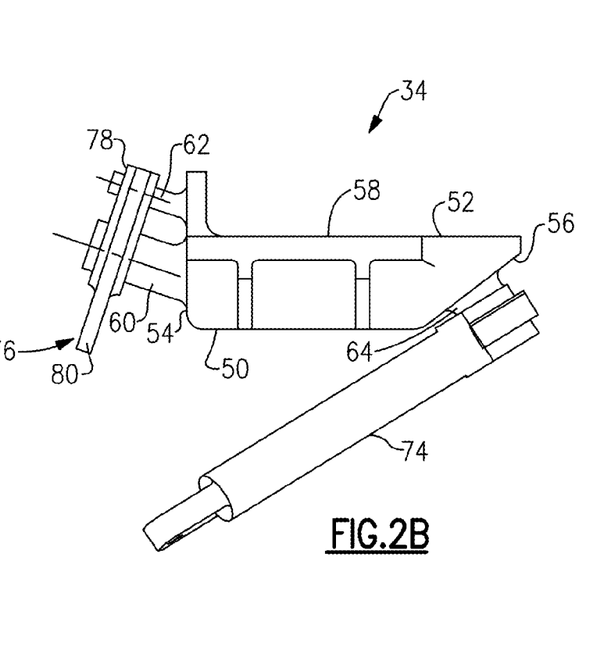
FIG. 2B is a side view of the forward mount assembly of FIG. 2A.

FIGS. 2A-2B show the forward engine mount assembly 34 in greater detail. The forward engine mount assembly 34 includes a front mount beam 50 having a main body 52 with a fore end 54 and an aft end 56. The main body 52 includes a generally flat upper surface 58 that mounts to the pyramid portion 38. The main body 52 can comprise a single-piece structure or can be comprised of two separate pieces that are attached to each other such that a crack cannot propagate from one piece to the other.

The front mount beam 50 includes a main pin 60 formed with the main body 52 and extending outwardly from the fore end 54 of the main body 52. A failsafe pin 62 is also formed with the main body 52 and extends outwardly from the fore end 54 of the main body 52. In the example shown, the main pin 60 is positioned vertically below the failsafe pin 62 and has a larger diameter than the failsafe pin 62. Further, the main pin 60 and failsafe pin 62 each extend at an obtuse angle relative to a generally flat end face defined at the fore end 54 of the main body 52.

A rear pin 64 is formed with the main body 52 and extends outwardly from the aft end 56 of the main body 52. The rear pin 64 connects a rudder bar 66 to the main body 52 as known. The rudder bar 66 includes a first end 68 and a second end 70 that are on opposite sides of the main body 52 from each other. A first thrust rod 72 is pivotally connected to the first end 68 and a second thrust rod 74 is pivotally connected to the second end 70 of the rudder bar 66. The first and second thrust rods 72, 74 extend in a forward direction to connect to the engine outer case 40 (see FIG. 1) as known.

Figure 3A:
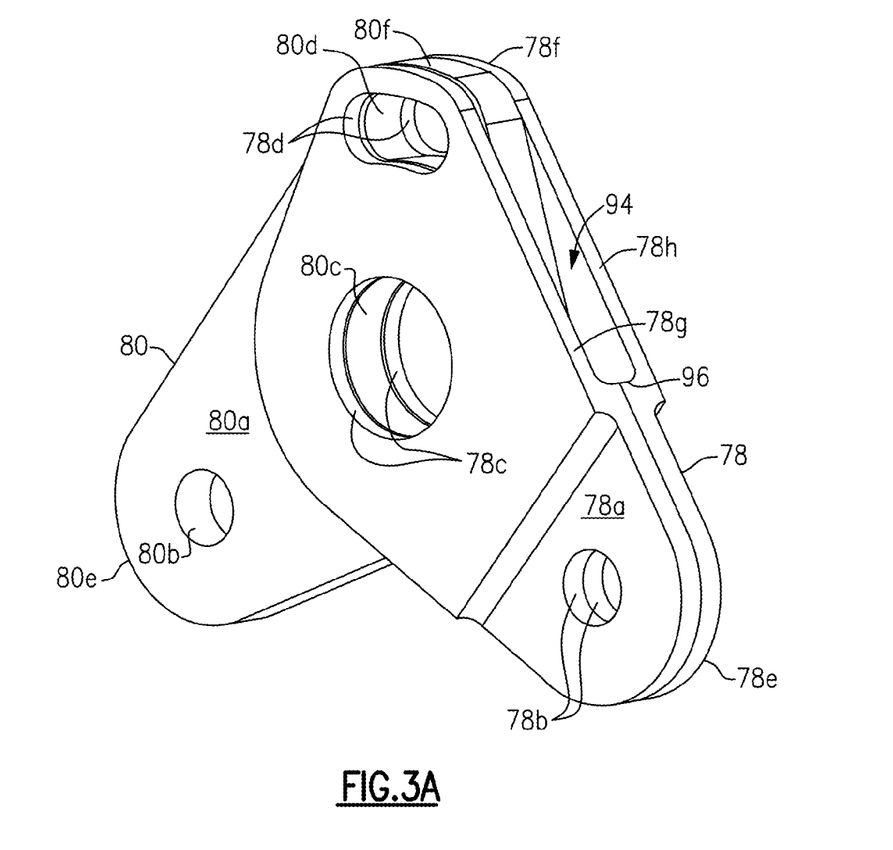
FIG. 3A is a perspective view of a shackle assembly of the forward mount assembly of FIG. 2A.
Figure 3B:
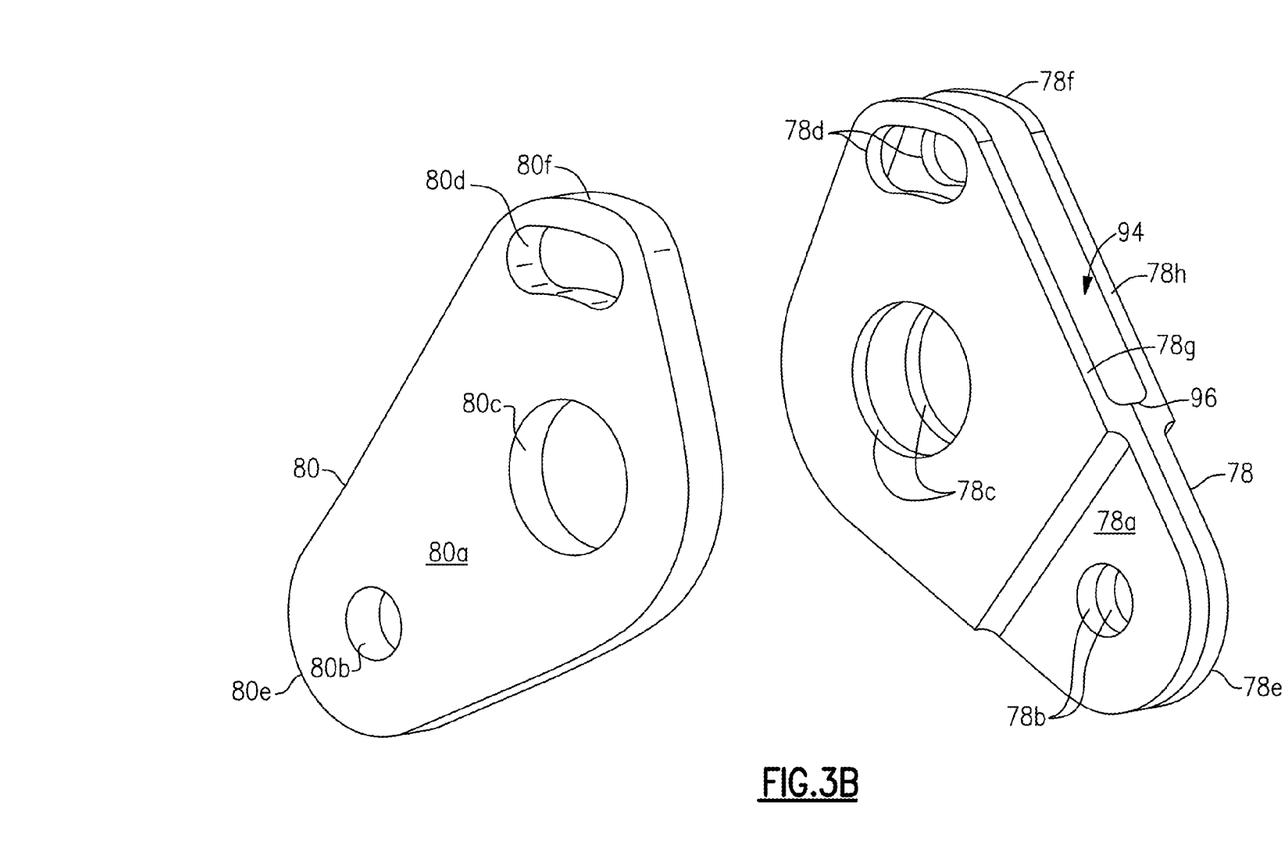
FIG. 3B shows first and second links of the shackle assembly in an unassembled state.

A forward shackle assembly 76 is supported by the fore end 54 of the mount beam 50. The forward shackle assembly 76 includes a first link 78 and a second link 80 that are pivotally attached to each other. As shown in FIGS. 3A-3B, the first link 78 comprises a first link body 78a having a first case connection hole 78b and a first beam connection hole 78c. The second link 80 comprises a second link body 80a having a second case connection hole 80b and a second beam connection hole 80c. When assembled, the first 78b and second 80b case connection holes are spaced apart from each other to define a first attachment interface 82 and a second attachment interface 84 (FIG. 2A) to the engine outer case 40 (FIG. 1), and the first 78c and second 80c beam connection holes are aligned with each other. The main pin 60 is fit through the aligned beam connection holes 78c, 80c.

Figures 4A, 4B, 4C, 5:
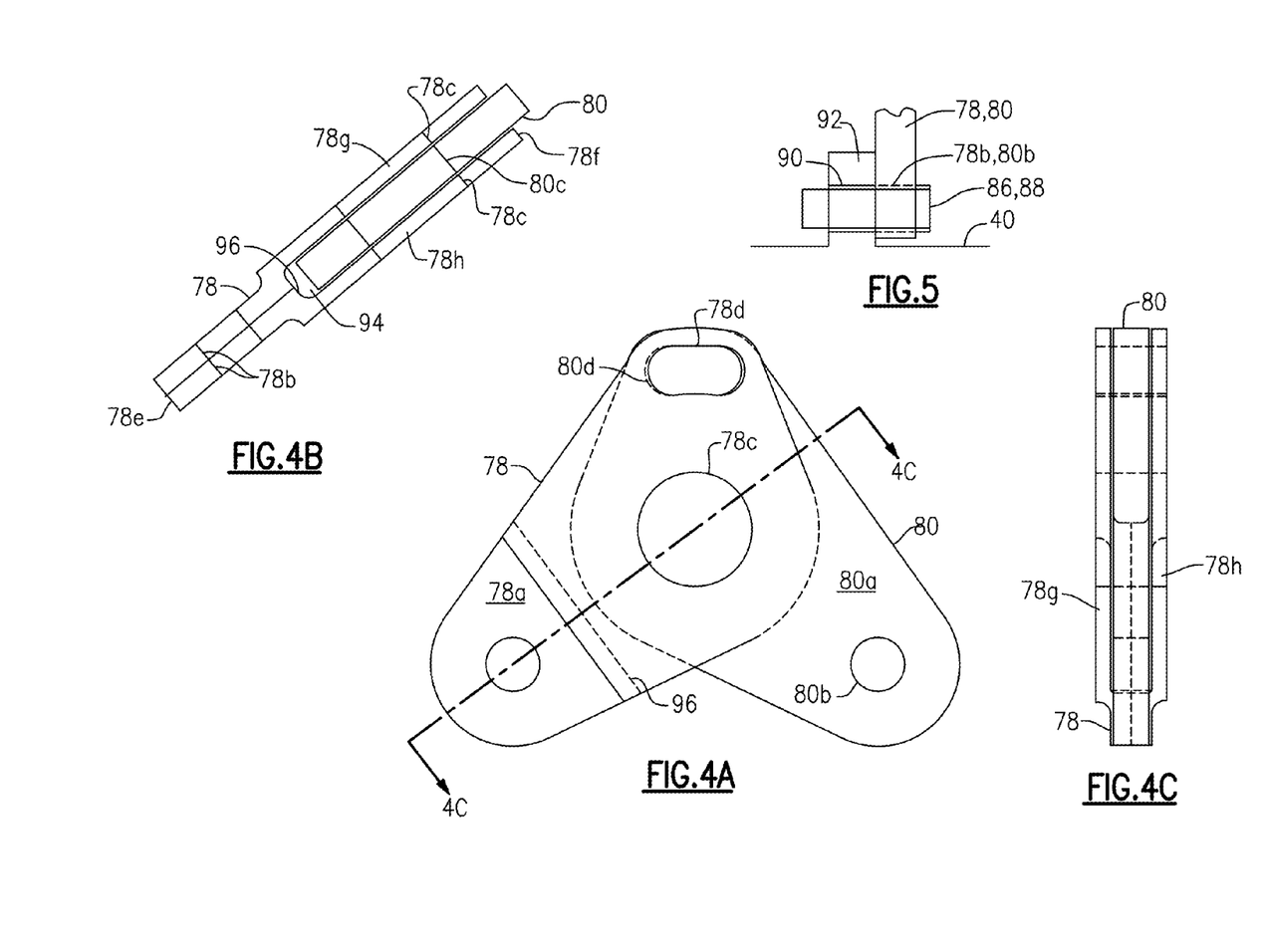
FIG. 4A is an end view of the shackle assembly of FIG. 3.
FIG. 4B is a side view of the shackle assembly of FIG. 3.
FIG. 4C is a cross-sectional view as indicated in FIG. 4A.
FIG. 5 shows a schematic illustration of a pin connection interface for each link to an engine outer case.

As shown in FIG. 2A, a first fastener or pin 86 is fit through the first case connection hole 78b and a second fastener or pin 88 is fit through the second case connection hole 80b. The pins 86, 88 connect to associated case holes 90 in mounting lugs 92 (only one is shown as an example) formed on the engine outer case 40 as shown in FIG. 5.

The first link body 78a also includes a first failsafe hole 78d and the second link body 80a includes a second failsafe hole 80d that is aligned with the first failsafe hole 78d when the links 78, 80 are assembled. The aligned failsafe holes 78d, 80d are fit onto the failsafe pin 62. In the example shown, the failsafe holes 78d, 80d comprise an elongated slot having an ovoid shape or kidney shape such that the failsafe pin 62 is easily assembled through the failsafe holes 78d, 80d without interference. This comprises a failsafe feature that does not come into effect, i.e. does not experience loading, unless there is a failure event.

If there is an engine case or pin failure event at either of the first 82 or second 84 attachment interfaces, the link engaged with the remaining pin at the first 82 or second 84 attachment interface will rotate until the failsafe pin 62 banks against one end of the slot. Vertical and lateral loads can then be carried through the one linked side of the shackle assembly 76. It should be understood that the failsafe holes 78d, 80d could comprise various shapes including an oversized circular hole, for example.

In the example shown, the first link 78 comprises a slotted link that receives a portion of the second link 80 in a nested or overlapping arrangement. The first link body 78a includes a first end 78e with the first case connection hole 78b and then extends to a second end 78f that includes the first failsafe hole 78d. The first beam connection hole 78c is positioned generally between the first case connection hole 78b and the first failsafe hole 78d. As the first link body 78a extends away from the first end 78e, the body separates into a first body portion 78g and a second body portion 78h that is spaced apart from the first body portion 78g by a gap or slot 94. Each of the first 78g and second 78h body portions include first beam connection holes 78c that are aligned with each other and first failsafe holes 78d that are aligned with each other. A bottom surface 96 of the slot 94 is positioned to allow for sufficient adjustment of the second link 80 relative to the first link 78, mount beam 50, and case holes 90 during assembly.

The first link 78 can comprise a single-piece component, or as best shown in FIG. 3A, the first link 78 can be formed from two separate identical plates that are attached to each other. This configuration would result in the first case connection hole comprising a pair of holes 78b, one in each plate, that are aligned with each other.

The second link body 80a includes a portion that is positioned within the slot 94 such that the second failsafe hole 80d is aligned with the first failsafe holes 78d in the first 78g and second 78h body portions and the second beam connection hole 80c is aligned with the first beam connection holes 78c in the first 78g and second 78h body portions. The second link 80 comprises a generally solid link with the second link body 80a including a first end 80e and a second end 80f. The first end 80e includes the second case connection hole 80b and extends to the second end 80f that includes the second failsafe hole 80d. The second beam connection hole 80c is positioned generally between the second case connection hole 80b and the second failsafe hole 80d.

The forward shackle assembly 76 comprises a scissor link configuration where one link attaches to a right hand case lug 92 and the other link attaches to a left hand case lug 92. The first 78 and second 80 links rotate relative to each other to accommodate variations in hole size for the case holes 90 in the lugs 92. As discussed above, the slot 94 is sized to allow for the relative variation. This shackle assembly 76 significantly reduces cost as the tolerance requirements for both the shackle and the engine case have been relaxed. Due to the two link configuration, loads are more equally shared between the case lug than in prior configurations, which also results in a weight reduction. Further, failsafe requirements are more fully satisfied as a failsafe alternative load path is provided by the failsafe holes and failsafe pin connection.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A forward engine mount assembly for a gas turbine engine comprising:
   a mount beam having a main body with a fore end and an aft end; and
   a forward shackle assembly supported by the fore end of the mount beam and comprising a first link configured to be connected to a first engine case structure and a second link configured to be connected to a second engine case structure, the first and second links being pivotally attached to each other, and wherein the forward shackle assembly includes a failsafe feature that allows loading to be carried through one of the first and second links if there is a failure with the other of the first and second links.

2. The forward engine mount assembly according to claim 1 wherein the first and second links each include at least a first hole for connection to a respective one of the first and second engine case structures and a second hole configured to receive a pin extending outwardly from the fore end of the mount beam that pivotally connects the first and second links.

3. The forward engine mount assembly according to claim 2 wherein the first and second case structures comprise mounting lugs with holes configured to receive pins to secure the first and second links to an engine outer casing.

4. The forward engine mount assembly according to claim 1 wherein one of the first and second links includes a slot to receive a portion of the other of the first and second links.

5. The forward engine mount assembly according to claim 4 wherein the first and second links are pivotally connected to each other with a pin that extends transversely through the slot.

6. The forward engine mount assembly according to claim 1 wherein the first link comprises a first link body having a first case connection hole and a first beam connection hole and the second link comprises a second link body having a second case connection hole and a second beam connection hole, and wherein the first and second case connection holes are spaced apart from each other and the first and second beam connection holes are aligned with each other.

7. The forward engine mount assembly according to claim 1 including a first thrust rod pivotally connected to the aft end of the mount beam and configured for connection to an engine outer case adjacent the first engine case structure and a second thrust rod pivotally connected to the aft end of the mount beam and configured for connection to the engine outer case adjacent the second engine case structure.

8. A forward engine mount assembly for a gas turbine engine comprising:
  a mount beam having a main body with a fore end and an aft end;
  a forward shackle assembly supported by the fore end of the mount beam and comprising a first link configured to be connected to a first engine case structure and a second link configured to be connected to a second engine case structure, the first and second links being pivotally attached to each other;
  wherein the first and second links each include at least a first hole for connection to a respective one of the first and second engine case structures and a second hole configured to receive a pin extending outwardly from the fore end of the mount beam that pivotally connects the first and second links; and
  wherein the first and second links each include a third hole configured to receive a failsafe pin extending outwardly from the fore end of the mount beam.

9. The forward engine mount assembly according to claim 8 wherein the second hole is positioned between the first and third holes on a link body of each of the first and second links.

10. A forward engine mount assembly for a gas turbine engine comprising:
  a mount beam having a main body with a fore end and an aft end;
  a forward shackle assembly supported by the fore end of the mount beam and comprising a first link configured to be connected to a first engine case structure and a second link configured to be connected to a second engine case structure, the first and second links being pivotally attached to each other;
  wherein the first link comprises a first link body having a first case connection hole and a first beam connection hole and the second link comprises a second link body having a second case connection hole and a second beam connection hole, and wherein the first and second case connection holes are spaced apart from each other and the first and second beam connection holes are aligned with each other; and
  wherein the first link body includes a first failsafe hole and the second link body includes a second failsafe hole that is aligned with the first failsafe hole.

11. The forward engine mount assembly according to claim 10 wherein the first link body includes a first end with the first case connection hole, and wherein the first link body comprises a first body portion and a second body portion spaced apart from the first body portion by a gap, each of the first and second body portions including aligned first beam connection holes and aligned first failsafe holes, and wherein the second link body is positioned within the gap such that the second failsafe hole is aligned with the first failsafe holes and the second beam connection hole is aligned with the first beam connection holes.

12. A gas turbine engine comprising:
  an engine outer case;
  a rear engine mount configured to attach the engine outer case to an aircraft support structure; and
  a forward engine mount configured to attach the engine outer case to the aircraft support structure, the forward engine mount comprising
    a mount beam having a main body with a fore end and an aft end,
    a forward shackle assembly supported by the fore end of the mount beam and comprising a first link connected to the engine outer case at a first attachment interface and a second link connected to the engine outer case at a second attachment interface, the first and second links being pivotally attached to each other, and wherein the forward shackle assembly includes a failsafe feature that allows vertical and lateral loads to be carried through one of the first and second links in light of a failure experienced by the other of the first and second links, and
    first and second thrust rods connected to the aft end of the main body and to the engine outer case.

13. The gas turbine engine according to claim 12 wherein the main body includes a pin extending outwardly from the fore end, and wherein the first link comprises a first link body having a first case connection hole and a first beam connection hole and the second link comprises a second link body having a second case connection hole and a second beam connection hole, and wherein the first and second case connection holes are spaced apart from each other and the first and second beam connection holes are aligned with each other and fit onto the pin.

14. The gas turbine engine according to claim 12 wherein the first and second attachment interfaces comprise first and second mounting lugs on the engine outer case.

15. The gas turbine engine according to claim 14 including a first pin that connects the first link to the first mounting lug and a second pin that connects the second link to the second mounting lug.

16. The gas turbine engine according to claim 12 wherein the failsafe feature comprises a first failsafe hole in the first link and a second failsafe hole in the second link, the first and second failsafe holes being aligned with each other and received on a failsafe pin of the mount beam.

17. A gas turbine engine comprising:
  an engine outer case;
  a rear engine mount configured to attach the engine outer case to an aircraft support structure; and
  a forward engine mount configured to attach the engine outer case to the aircraft support structure, the forward engine mount comprising
    a mount beam having a main body with a fore end and an aft end,
    a forward shackle assembly supported by the fore end of the mount beam and comprising a first link connected to the engine outer case at a first attachment interface and a second link connected to the engine outer case at a second attachment interface, the first and second links being pivotally attached to each other, and
    first and second thrust rods connected to the aft end of the main body and to the engine outer case;
  wherein the main body includes a pin extending outwardly from the fore end, and wherein the first link comprises a first link body having a first case connection hole and a first beam connection hole and the second link comprises a second link body having a second case connection hole and a second beam connection hole, and wherein the first and second case connection holes are spaced apart from each other and the first and second beam connection holes are aligned with each other and fit onto the pin; and
  wherein the pin comprises a main mount pin and wherein the main body includes a failsafe pin extending outwardly from the fore end of the main body and spaced apart from the main mount pin, and wherein the first link body includes a first failsafe hole and the second link body includes a second failsafe hole that is aligned with the first failsafe hole, and wherein the failsafe pin is fit into the first and second failsafe holes.

18. The gas turbine engine according to claim 17 wherein the first link body includes a first end with the first case connection hole, and wherein the first link body extends from the first end and separates into a first portion and a second portion spaced apart from the first portion by a gap, each of the first and second portions including aligned first beam connection holes and aligned first failsafe holes, and wherein the second link body is positioned within the gap such that the second failsafe hole is aligned with the first failsafe holes and the second beam connection hole is aligned with the first beam connection holes.

19. The gas turbine engine according to claim 17 wherein the failsafe pin banks against an edge of the first and second failsafe holes when one of the first or second attachment interfaces experiences a failure.

* * * * *